Patented June 1, 1954

2,680,118

UNITED STATES PATENT OFFICE 2,680,118

LACTONE PREPARATION

William S. Emerson, Raymond I. Longley, Jr., and Theodore C. Shafer, Dayton, Ohio, assignors to Monsanto Chemical Company, St. Louis, Mo., a corporation of Delaware No Drawing. Application December 13, 1950, Serial No. 200,694

4 Claims. (Cl. 260—343.5)

This invention relates to a novel method for the preparation of useful lactones. More specifically the invention is directed to a method of preparing a class of lactones by the hydrolysis of alkoxydihydropyrans.

The primary purpose of the invention is to provide a convenient and economical method of preparing certain lactones. A further purpose is to convert alkoxydihydropyrans into useful δ-calerolactones. Other purposes will be apparent from an inspection of the following description of the invention.

In the copending application of Raymond I. Longley, Jr., Serial No. 106,483, filed July 23, 1949, now abandoned, there are described and claimed various alkoxydihydropyrans and substitution products thereof which are useful in the preparation of lactones in accordance with this invention. The copending application describes the reaction between vinyl or substituted vinyl ethers and $\alpha,\beta$-unsaturated aldehydes or ketones. The interreaction of these reagents forms alkoxydihydropyrans having the following structure:

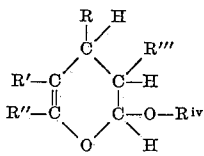

wherein $R^{iv}$ is an alkyl radical having up to four carbon atoms, and the radicals R, R', R'', and R''' may be hydrogen or any alkyl radical having from one to four carbon atoms, such as methyl, ethyl, propyl, isopropyl, n-butyl and isobutyl.

In accordance with this invention it has been found that the alkoxydihydropyrans may be hydrolyzed in the presence of a hydrogenation catalyst to form δ-valerolactones substantially according to the scheme:

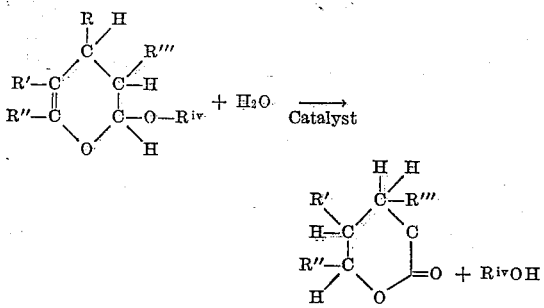

The hydrolysis is conducted by treating the alkoxydihydropyrans with water at elevated temperatures, under pressure and in the presence of the catalyst. The hydrolysis is operated at a temperature of from, say, 125° C. to 275° C., and preferably at 140° C. to 250° C. depending on the catalyst used. The reactions may require from a few minutes to several hours, depending upon the conditions of reaction, and the nature of the individual reactant.

The hydrolysis is conducted in an autoclave or other closed vessel capable of withstanding superatmospheric pressures and preferably adapted to maintain the contents in an agitated condition. Thus, stirred autoclaves or autoclaves with rocking or tumbling mechanisms, are useful. Pressure conditions should be sufficient to maintain the water in the liquid phase at the temperatures employed. Suitable catalysts are hydrogenation catalysts, generally, e. g., copper chromite, finely divided nickel, palladium black, oxides of metals such as molybdenum, tungsten or cobalt, etc. It may be desirable to add a mutual solvent for the water and the alkoxydihydropyran such as dioxane, methanol, etc. With certain catalysts it also may be desirable to maintain a low pressure of hydrogen in the reaction vessel.

The following tabulation demonstrates the manner in which the various dihydropyran intermediates may be prepared by the selection of the alkyl vinyl ether or substituted vinyl ether and the $\alpha,\beta$-unsaturated aldehyde or ketone. The mechanism by which the intermediates are converted to lactones is shown above.

(A) Raw materials --- Methyl vinyl ketone; ethyl vinyl ether.
Intermediate ----- 2-ethoxy-6-methyl-3,4-dihydro-1,2-pyran.
Lactone --------- δ-methyl-δ-valerolactone.
(B) Raw materials --- Acrolein; methyl vinyl ether.
Intermediate ----- 2-methoxy-3,4-dihydro-1,2-pyran.
Lactone --------- δ-valerolactone.
(C) Raw materials --- Crotonaldehyde; ethyl vinyl ether.
Intermediate ----- 2-ethoxy-4-methyl-3,4-dihydro-1,2-pyran.
Lactone --------- β-methyl-δ-valerolactone.
(D) Raw materials --- Ethyl isopropenyl ketone; methyl vinyl ether.
Intermediate ----- 2-methoxy-5-methyl-6-ethyl-3,4-dihydro-1,2-pyran.
Lactone --------- γ-methyl-δ-ethyl-δ-valerolactone.
(E) Raw materials --- Vinyl methyl ether; methacrolein.
Intermediate ----- 2-methoxy-5-methyl-3,4-dihydro-1,2-pyran.
Lactone --------- Mixture of α-methyl-δ-valerolactone and γ-methyl-δ-valerolactone.
(F) Raw materials --- Butenyl methyl ether; acrolein.
Intermediate ----- 2-methoxy-3-ethyl-3,4-dihydro-1,2-pyran.
Lactone --------- Mixture of α-ethyl-δ-valerolactone and γ-ethyl-δ-valerolactone.

Of the alkoxydihydropyrans having the above general formula, compounds prepared by the reaction of acrolein, methacrolein or crotonaldehyde with a vinyl, propenyl or butenyl alkyl ether, are of special importance because of their ready availability. Such compounds have the general formula

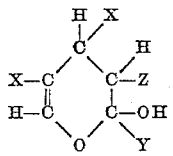

in which X is selected from the class consisting of hydrogen and the methyl radical, Y is an alkyl radical of from 1 to 4 carbon atoms and Z is selected from the class consisting of hydrogen and the methyl and ethyl radicals. Compounds having the above general formula are readily hydrolyzed by the present process to yield δ-valerolactones.

Compounds within this class which are prepared from alkyl vinyl ethers and acrolein or β-substituted acroleins, e. g., crotonaldehyde, are 2-alkoxy-3,4-dihydro-1,2-pyrans or 4-alkyl-2-alkoxy-3,4-dihydro-1,2-pyrans which are very easily converted by the present process to give δ-valerolactone or β-alkyl-δ-valerolactones:

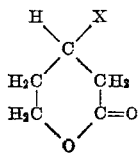

in which X is selected from the class consisting of hydrogen and alkyl radicals of from 1 to 4 carbon atoms.

Another class of easily prepared dihydropyran ethers is that obtained by reaction of alkyl vinyl ketones or alkyl isopropenyl ketones with alkyl vinyl ethers, or alkyl propenyl ethers. This class of compounds has the general formula

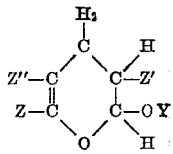

in which Y is an alkyl radical of from 1 to 4 carbon atoms, Z is selected from the class consisting of hydrogen and alkyl radicals of from 1 to 4 carbon atoms and Z' and Z'' are selected from the class consisting of hydrogen and the methyl radical. Compounds having the above general formula are readily hydrolyzed by the present process to yield δ-alkyl-δ-valerolactones or derivatives thereof having one or more methyl radicals substituted in the α- and/or γ-positions.

Compounds prepared by the reaction of acrolein or of an alkyl vinyl ketone with an alkyl vinyl ether are the most easily obtainable dihydropyran ethers for use in the present process. Such compounds have the general formula

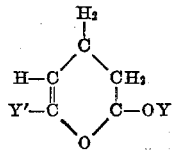

in which Y is an alkyl radical of from 1 to 4 carbon atoms and Y' is selected from the class consisting of hydrogen and alkyl radicals of from 1 to 4 carbon atoms. Compounds having the above general formula are readily hydrolyzed according to this invention to yield δ-valerolactone or δ-alkyl-δ-valerolactones in which the alkyl radical has from 1 to 4 carbon atoms.

Hydrolysis, by the present process, of 2-alkoxy-3,4-dihydro-1,2-pyrans having a substituent in the 3- or 5-position generally leads to a mixture of isomeric δ-valerolactones. Thus, as shown above under (E) and (F), a mixture of α-alkyl-δ-valerolactone and γ-alkyl-δ-valerolactone is obtained when either a 3-alkyl- or a 5-alkyl-2-alkoxy-3,4-dihydro-1,2-pyran is hydrolyzed.

The invention is further illustrated, but not limited, by the following example:

*Example*

β-methyl-δ-valerolactone from 2-methoxy-4-methyl-3,4-dihydro-1,2-pyran.—A mixture of 353 g. of 2-methoxy-4-methyl-3,4-dihydro-1,2-pyran (prepared from crotonaldehyde and methyl vinyl ether), 100 cc. of water and 30 g. of copper chromite was shaken in a rocking autoclave at 200° C. for five hours. The mixture was filtered and the filtrate distilled to give, after a 35.5 g. forerun, 163.5 g. (52%) of β-methyl-δ-valerolactone, B. P. 107° C./14 mm., $n_D^{25}$ 1.4493–1.4496. The analytical sample boiled at 72° C./2 mm., $n_D^{25}$ 1.4496.

*Anal.*—Calcd. for $C_6H_{10}O_2$: C, 63.1; H, 8.8; Found: C, 63.1; H, 8.4.

We claim:

1. The method of preparing δ-valerolactone which comprises heating a 2-alkoxy-3,4-dihydro-1,2-pyran compound, in which the alkoxy radical has from 1 to 4 carbon atoms, with water in the presence of copper chromite and under superatmospheric pressure.

2. The method of preparing β-methyl-δ-valerolactone which comprises heating 2-methoxy-4-methyl-3,4-dihydro-1,2-pyran with water in the presence of copper chromite and under superatmospheric pressure.

3. The method of preparing β-methyl-δ-valerolactone which comprises heating 2-methoxy-4-methyl-3,4-dihydro-1,2-pyran with water at a temperature of from 175° C. to 275° C., in a closed vessel and in the presence of copper chromite.

4. The method which comprises heating, with water at superatmospheric pressure and in the presence of copper chromite, a pyran compound selected from the class consisting of a 2-alkoxy-3,4-dihydro-1,2-pyran and a 2-alkoxy-4-alkyl-3,4-dihydro-1,2-pyran in which the alkyl radical and the alkoxy radical each has from 1 to 4 carbon atoms and recovering from the resulting reaction product a lactone selected from the class consisting of δ-valerolactone and 4-alkyl-δ-valerolactones in which the alkyl radical has from 1 to 4 carbon atoms.

References Cited in the file of this patent

UNITED STATES PATENTS

| Number | Name | Date |
|---|---|---|
| 2,420,250 | Kyrides | May 6, 1947 |
| 2,444,301 | Kyrides | June 29, 1948 |
| 2,514,168 | Smith et al. | July 4, 1950 |
| 2,541,747 | Copelin | Feb. 13, 1951 |